United States Patent
Benaron et al.

(10) Patent No.: US 7,427,165 B2
(45) Date of Patent: Sep. 23, 2008

(54) OPTICAL AND ELECTRICAL HYBRID CONNECTOR

(75) Inventors: David A. Benaron, Portola Valley, CA (US); Ilian H. Parachikov, Belmont, CA (US); Michael R. Fierro, Los Gatos, CA (US); Marvin K. Hutt, Oakland, NJ (US)

(73) Assignee: Spectros Corporation, Portola Valley, CA (US)

( * ) Notice: Subject to any disclaimer, the term of this patent is extended or adjusted under 35 U.S.C. 154(b) by 0 days.

(21) Appl. No.: 11/154,023

(22) Filed: Jun. 15, 2005

(65) Prior Publication Data

US 2006/0098921 A1   May 11, 2006

Related U.S. Application Data

(60) Provisional application No. 60/580,414, filed on Jun. 16, 2004.

(51) Int. Cl.
  *G02B 6/38* (2006.01)
  *G02B 6/36* (2006.01)
(52) U.S. Cl. .............. 385/75; 385/55; 385/78
(58) Field of Classification Search ........... 385/53, 385/55, 75, 78, 101; 606/15
  See application file for complete search history.

(56) References Cited

U.S. PATENT DOCUMENTS

| | | | |
|---|---|---|---|
| 4,080,040 A | 3/1978 | Lancaster | 439/43 |
| 4,925,267 A * | 5/1990 | Plummer et al. | 385/74 |
| 5,259,052 A | 11/1993 | Briggs et al. | 385/78 |
| 5,696,861 A * | 12/1997 | Schimmeyer et al. | 385/75 |
| 5,764,834 A * | 6/1998 | Hultermans | 385/60 |
| 6,533,466 B1* | 3/2003 | Smith | 385/75 |
| 6,550,979 B1 | 4/2003 | Fleenor et al. | 385/78 |
| 6,588,938 B1 | 7/2003 | Lampert et al. | 385/58 |
| 6,599,025 B1 | 7/2003 | Deutsch | 385/75 |
| 6,612,857 B2 | 9/2003 | Tolmie | 439/199 |
| 6,652,155 B2 * | 11/2003 | Lampert | 385/76 |
| 2003/0235379 A1* | 12/2003 | Lin | 385/101 |
| 2004/0218873 A1* | 11/2004 | Nagashima et al. | 385/75 |

FOREIGN PATENT DOCUMENTS

| WO | WO 01/42839 A2 | 6/2001 |
|---|---|---|
| WO | WO 03/086173 A2 | 10/2003 |

\* cited by examiner

*Primary Examiner*—Sung Pak
*Assistant Examiner*—Daniel Petkovsek
(74) *Attorney, Agent, or Firm*—Morgan, Lewis & Bockius LLP

(57) ABSTRACT

An improved hybrid connector for rapidly, reliably, and reversibly making mixed optical and electrical connections has a plug (103) with one or more centrally located fiber-containing optical ferrules (108) and one or more peripheral electrical contacts (109), and second, a socket (105) with interior electrical contacts (115) and a fiber-bearing central floating optical connector (225). Insertion and rotation of a shaft (107) of the plug into a bore (201) of the socket connects the respective electrical contacts of the shaft and socket, and nearly-simultaneously couples the respective optical fibers of the plug ferrule and socket connector, thus creating a rapid, reversible, and low-cost hybrid connection optimized for both the electrical and optical requirements of a mixed optical and electrical connection.

20 Claims, 7 Drawing Sheets

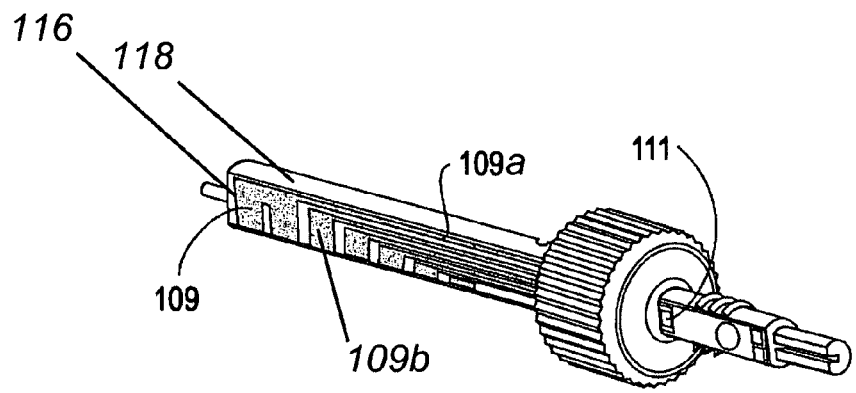
FIG. 2
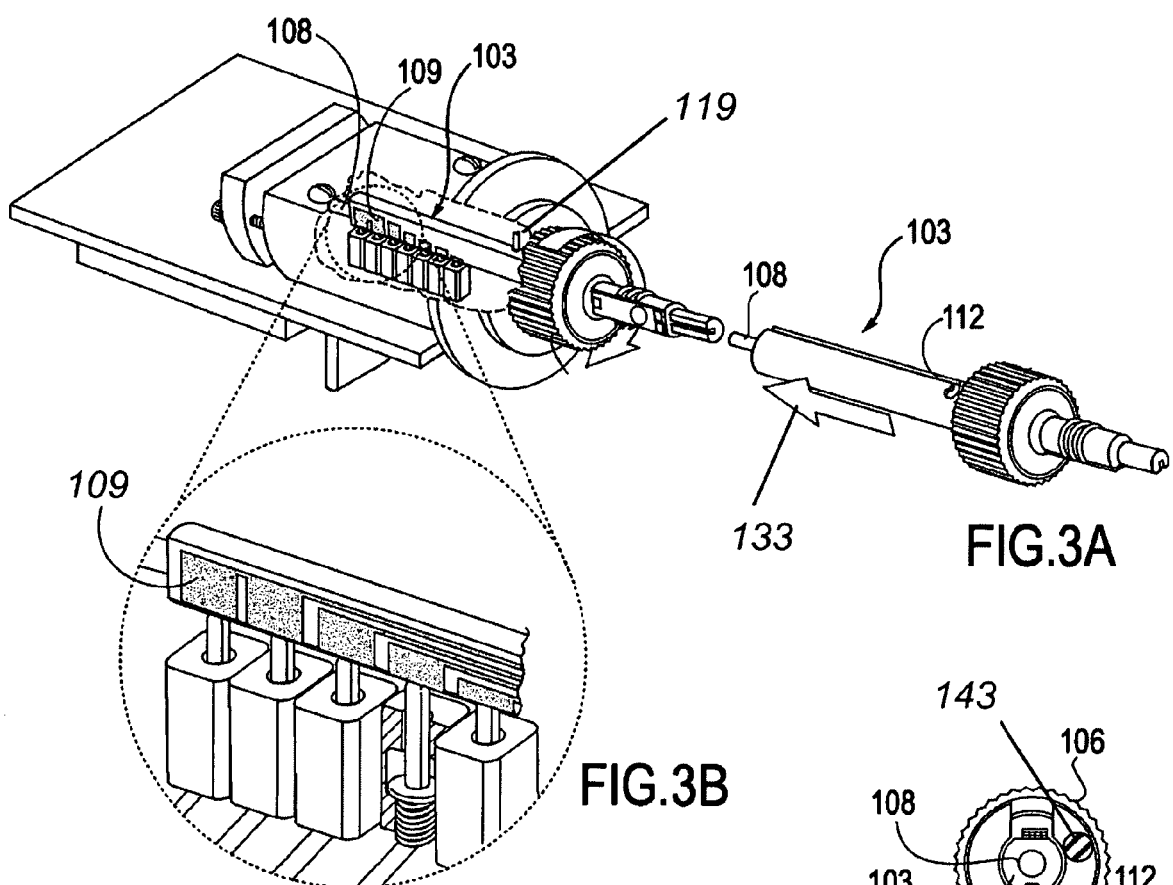
FIG. 3A
FIG. 3B
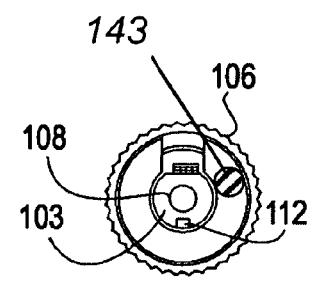
FIG. 4

OPTICAL AND ELECTRICAL HYBRID CONNECTOR

RELATED APPLICATION

This application claims priority to Provisional Patent application Ser. No. 60/580,414, filed on Jun. 16, 2004, the disclosure of which is hereby incorporated by reference in its entirety.

FIELD OF THE INVENTION

The present invention relates to plug and socket connector systems for providing inexpensive, reversible, axial-position-error tolerant (Z-tolerant) mixed optical and electrical connections, and more particularly to a quick-insertion, non-shorting, rotationally-engaged, shaft and socket connector having one or more Z-tolerant float-coupled optical fibers located centrally inside an elongated shaft, and one or more Z-tolerant wide electrical contact array elements located peripherally on a flexible PC board mounted externally on the same shaft, for the purpose of creating reversible optical/electrical hybrid connections, thus avoiding much of the expense, awkwardness, and required axial precision inherent in conventional hybrid connector systems.

BACKGROUND OF THE INVENTION

The traditional optical or electrical connector is a monolithic device, optimized for the delivery of a single signal type—either optical or electrical. There are reasons for this traditional separation of connectors by signal type. First, most applications require only one type of transmitted signal, and thus do not demand the additional design and materials expense involved in hybrid connections. Second, inherent features required for good electrical connections (e.g., good physical contact with contact element wiping, low axial positional mating accuracy, and no need of contact finishing after assembly) are different, and often contrary, to those features required for good optical fiber coupling (avoiding physical contact which damages fiber faces, high axial positional mating accuracy, and required post-assembly fiber-end finishing steps).

These limitations and requirements are best appreciated by examining the source of such differences between optical and electrical connections during mating and assembly.

First, consider the presence or avoidance of physical contact during mating. Electrical connections generally require good physical contact in order to achieve reliable, low-resistance current flow. Metallic contacts also tend to accumulate surface deposits and corrosion over time, so a "wiper" effect is usually incorporated into the physical make-and-break actions to facilitate ongoing contact cleaning. In contrast, good physical contact between optical fibers is generally to be discouraged because the layered glass faces of fibers are fragile. Direct physical contact between optical fibers damages the cladding that keeps light within the fibers, scratches the optical fiber face where light is transmitted, or shatters the fiber body entirely, all of which reduce fiber light transmission or renders the fiber useless.

Second, consider the axial (Z-axis) positional accuracy required during mating. Electrical pin and socket connections, once inserted part way, usually continue to work well as the elements are pushed farther together. In fact, a bit of additional insertion in electrical contacts usually leads to improved contact due to the increased contact surface area and wiping effects. Therefore, there is little Z-axis positional accuracy typically required to make an electrical connection work well. This permits electrical contacts to be manufactured cheaply in large arrays using low-axial-accuracy metal pins and sockets, such as the standard D-pin connectors used in the computer industry which have 9 to 100's of pins in a planar (flat XY-axis plane perpendicular to the axis of insertion) arrangement. Such planar electrical contacts typically also have lateral pin wiggle—easily demonstrated in a 9-pin standard D-Pin connector in which the male pins each show millimeter lateral movement if physically perturbed.

In contrast, optical connectors are not so tolerant of error. Fiber connections have lateral (XY-axis) and axial (Z-axis) positional mating accuracy requirement as much as 1,000-fold more precise than for the above-described electrical connections. An optical fiber's tolerance for positional error is typically very low for several inherent reasons. First, axial (Z-axis) movement of optical fibers away from each other results in a loss of optical coupling; while axial movement toward each other must be carefully limited in order to prevent collisions between the fiber ends. Such collisions can seriously damage most optical fiber faces. Second, a seemingly minor lateral positional misalignment of a pair of optical fibers typically leads to huge fiber coupling losses. For illustration, a mere 0.004 inch lateral offset between a 100 micron pair of multimode fibers can lead to a complete loss of transmitted light.

Because of this need for micron alignment between coupled optical fibers, fiber connections typically require high-precision components in the connector. These precision components—including laser drilled ferrules and milled stainless-steel couplers—translate to a high connector cost. For example, a pair of industry-standard SMA-type optical plugs and central mating dual-female coupler connector, allowing for the joining of only a single pair of fibers, retails at many times the price of a pair of 25-pin D-type electrical array male/female connectors.

Third, one must consider the accessibility of the contacts during assembly and finishing. Electrical pins are typically shielded or hooded, and the sockets recessed, to prevent wire to wire shorting. In contrast, optical fiber ferrules must typically protrude beyond any protective holders in order to allow for fiber finishing (such as gluing, sanding, and polishing) after a new, bare optical connector is stuffed and glued with an optical fiber.

All told, when taking into consideration the above inherent limitations, electrical and optical connectors have physical contact, positional accuracy, and post-assembly requirements that come directly into conflict, and such conflicting requirements are not readily simultaneously satisfied.

The above limitations of conventional connectors are apparent in the art.

Hybrid optical and electrical connectors are known. Such deployments are most typically planar (XY-axis), in which the mating elements form a face that is flat and perpendicular to the axial mating axis. For example, WO 01/042839 and U.S. Pat. No. 6,612,857 teach independent detachable electrical or optical assemblies that are combined into a single hybrid connector. U.S. Pat. No. 6,599,025 teaches a hybrid with the optical fiber positioned between the electrical elements of a standard connector. U.S. Pat. No. 6,588,938 teaches a hybrid housing with planar arrays of electrical contact maintained by springs. An independent element hybrid commercial product is known (Miniature F7 Contact for Multi and Hybrid Fibre Optic Connectors, sold by Lemo S. A. of EcublensSwitzerland). These Lemo connectors, by failing to simultaneously optimize the different requirements of optical and electrical connections through Z-tolerance, remain expensive (greater than U.S. $100 per connector). All of these hybrid devices remain simple, non-optimized devices that suffer from the drawback that they use independent, standard, planar coupling elements without optimization of the differing and conflicting electrical and optical mating requirements, and do not suggest or teach a need for increased axial tolerance, all of which is required for low-cost simultaneous mating of both the electrical and optical signals.

Axial (Z-axis) deployment of the electrical contacts along a shaft is a known, though uncommon, alternative to planar contact deployment. U.S. Pat. No. 4,080,040 teaches a longitudinal (axial) arrangement of multiple electrical contact elements along a patch-cord plug and receiving jack, but does not teach how to reduce the axial positional accuracy requirements of the connector through use of floating or lens-coupled elements for fibers in a hybrid design. Combination of this or other axial plug and socket arrangements with optical fibers, as is taught in the cited hybrid connectors above, would be insufficient to achieve Z-tolerance, as a need for Z-tolerant elements to increase axial tolerance is neither taught nor suggested in either body of art.

Optical elements facilitating good fiber coupling along with reduced axial mating accuracy are known. U.S. Pat. No. 5,259,052 teaches a limited-movement floating ferrule that is used to couple two fiber optic plugs. U.S. Pat. No. 6,550,979 teaches a spring-coupled ferrule which urges the ferrule holder in a direction axially toward the mated fiber. However, these are free standing optical elements, without consideration of the design requirements of simultaneous electrical connections, and therefore combination with known hybrid designs is non-trivial. These floating device elements neither teaches nor suggests combining a floating optical element into a hybrid electrical/optical connector that simultaneously optimizes both electrical and optical mating in the presence of the floating elements, a non-trivial manufacturing step.

Each of the above connector systems and methods suffer from one or more limitations noted above, in that they do not incorporate Z-tolerance into both optical and electrical connecting elements (e.g., do not incorporate improved axial tolerance at all, or are not combined into a single, integrated connector that simultaneously optimizes the mating requirements of both the optical and electrical connections), which makes manufacturing and assembly of a hybrid connector technically difficult or expensive.

None of the above systems suggest or teach efficiently combining optical and electrical contacts into a single hybrid connector device optimized for both electrical and optical connections with both (a) a Z-tolerant coupling for the optical elements, and (b) a Z-tolerant coupling for an axial electrical array, together resulting in a low-cost of manufacture, ease of assembly, and single connector ease-of-use. A hybrid electrical and optical shaft and socket connector incorporating a Z-tolerant axial electrical array integrated with a Z-tolerant floating or lens-coupled fiber array has not been taught or suggested, nor to our knowledge has such a tool been previously successfully manufactured and commercialized.

SUMMARY AND OBJECTS OF THE INVENTION

The present invention relies upon the knowledge of design considerations needed to achieve a hybrid plug and socket connector with a Z-tolerant central floating optical fiber coupler and a Z-tolerant axial peripheral electrical contact array, allowing for rapid, inexpensive, axial-position-tolerant, self-wiping, reliable connections between connector elements, so as to provide an improved connection. The benefits include rapid connection, rapid disconnection, low-cost, disposability, reproducibility, and reliability. This allows the implementation of medical monitors and probes more simply and inexpensively than has been achieved using commercially available connectors.

A salient feature of the present invention is that, while both electrical and optical connectors have different positional-accuracy mating requirements, the concurrent use of (a) a Z-tolerant, axially deployed, wide contact, peripheral electrical contact array and (b) a Z-tolerant floating central fiber core allows the differing mating requirements to be reliably and simultaneously satisfied. The floating optical core fiber is self-aligning, self-centering, axially-position-tolerant, and highly stable and reproducible. The floating component takes up Z-axis positional inaccuracies while maintaining absolute control over the distance between the coupled fiber faces. More than one fiber can be used. At the same time, the linear electrical array allows broad, self-wiping, non-shorting, physical contact areas which are themselves Z-tolerant, without the high-mating-requirements typically demanded by optical matings. This substantially lowers the cost of the electrical connectors, while maintaining expandability of 1 to N non-shorting quick-connect contacts. Further, such wide contacts can be molded or provided by a flexible PC board very inexpensively, making the entire connector, and in particular the plug portion, manufacturable at very low cost.

Accordingly, an object of the present invention is to provide a Z-tolerant hybrid connector using a wide-electrical-contact array peripherally and circumferentially deployed around a central fiber core, which is itself Z-tolerant due to lens or float coupling. In its simplest from, the fiber core has only one fiber coupled using an axial floating coupler, and at least two wide peripheral electrical contacts, but this may be expanded to add additional optical fibers and electrical contacts as needed. Similarly, some of the electrical contacts may be replaced or supplemented by non-contact ID chips (such as the emerging Radio Frequency Identification ("RFID") standard chip sets) that do not require a direct connection.

Another object is to provide a non-shorting electrical contact array with good physical contact that is engaged and wiped by rotation of the plug after insertion into the socket, enabling use with sensitive electronics or high-power applications.

Another object is to provide for a high-precision stabilization of the optical connections, which are stabilized by a locking action with partial rotation of the plug shaft.

Another object is to provide for a reversible quick-connection, with connection occurring in less than one full turn of a plug shaft, and preferably latching in one-fourth clockwise turn. This in turn allows for natural quick attachment and also permits quick disconnection, with disconnection occurring again in less than one full turn of the shaft, and preferably in one-fourth counterclockwise turn.

Another object is to provide for probes and systems with integrated connector systems, allowing for improved medical spectroscopic devices.

A final object is to provide for a connector with embedded identification and data, such as probe type, for example via EEPROM accessible across the connectors electrical connections, or even by non-contact functions, such as the RFID chips used in proximity tags and non-contract identity badges.

The improved hybrid connector as described has multiple advantages.

One advantage is that devices with both electrical and optical connections can be attached or disconnected using a single connector.

Another advantage is that a centered fiber with coupling ferrule or coupling channel is self-aligning, and allows incorporation of Z-tolerant optical coupling techniques, such as transfer or collimating lenses and elements, floating couplers, and the like.

Another advantage is that this attachment can occur reversibly, rapidly, and reliably.

Another advantage is that the costly parts (the precision, floating alignment tube into which a shaft ferrule fits or a reverse collimating lens) can be placed into the socket connector, while the male plug shaft has only printed-circuit or card edge contacts, and low-tolerance optical ferrules, which are inexpensive compared to individual electrical contacts and precision optical connectors, thus reducing the cumulative cost of deployment of these connectors.

A further advantage is that the electrical connection can be expanded as to any number of contacts, simply by increasing the length of the inserted shaft, reducing the spacing of the contacts, or adding additional parallel electrical array contact rows.

There is provided a Z-tolerant hybrid connector for providing a reliable, rapid, unified, and reversible connection for mixed electrical and optical connections, specifically in the examples shown for the purpose of enabling spectroscopic analysis in human patients in real time. In one example, the Z-tolerant connector uses an axial plug with a semi-circumferential-element linear electrical contact array deployed axially along its long axis, with central fiber and optical connection elements. A floating axial positionally tolerant floating coupler allows the fiber coupling to maintain a high internal axial accuracy with an inexpensive low axial-accuracy plug shaft. The plug mates reversibly to a socket containing a keyed channel into which the plug's shaft is fully inserted and then rotated. A turn of the plug shaft mates the electrical pads on the plug shaft with the spring contacts in the hollow channel of the socket, as well as stabilizing and securing the plug. Removal is achieved by rotation in the opposite direction, breaking the electrical contacts and allowing the plug to be removed from the hollow channel. Medical probes and systems incorporating the improved connector are also described.

These and other advantages of the invention will become apparent when viewed in light of the accompanying drawings, examples, and detailed description. The breadth of uses and advantages of the present invention are best understood by the detailed explanation of the workings of a hybrid connector, now constructed and tested in laboratory and clinical medical monitors.

BRIEF DESCRIPTION OF THE DRAWINGS

The invention will be more clearly understood from the following description in connection with the accompanying drawings of which:

FIG. 2 is a perspective view of the plug;

FIG. 3A is a perspective view partly in section showing the plug as it is inserted and seated into the socket;

FIG. 3B is an enlarged view of a portion of the inserted plug and socket of FIG. 3A;

FIG. 4 is a front view of the plug;

DEFINITIONS

Figures 1A, 1B:
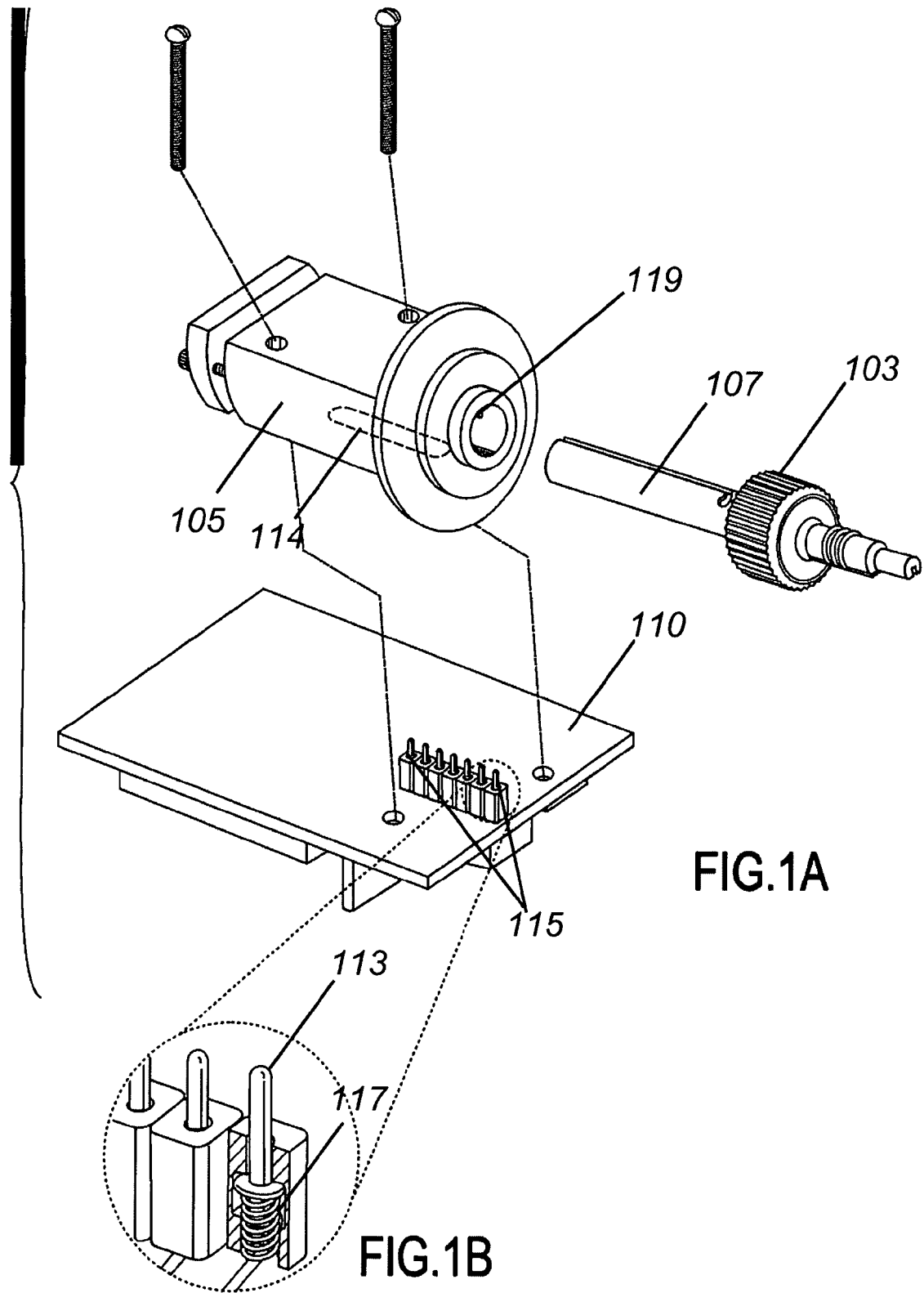
FIG. 1A is an exploded perspective view of a plug and socket in accordance with the present invention.
FIG. 1B is an enlarged view of the spring loaded contacts in the socket of FIG. 1A.
Figure 5:
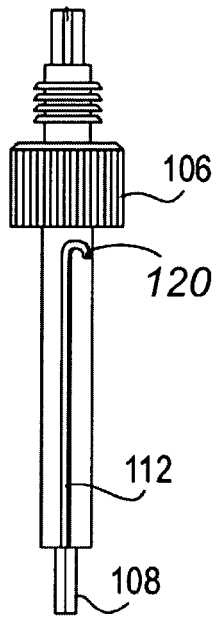
FIG. 5 is a side view of the plug showing the guiding and locking channel.
Figure 6:
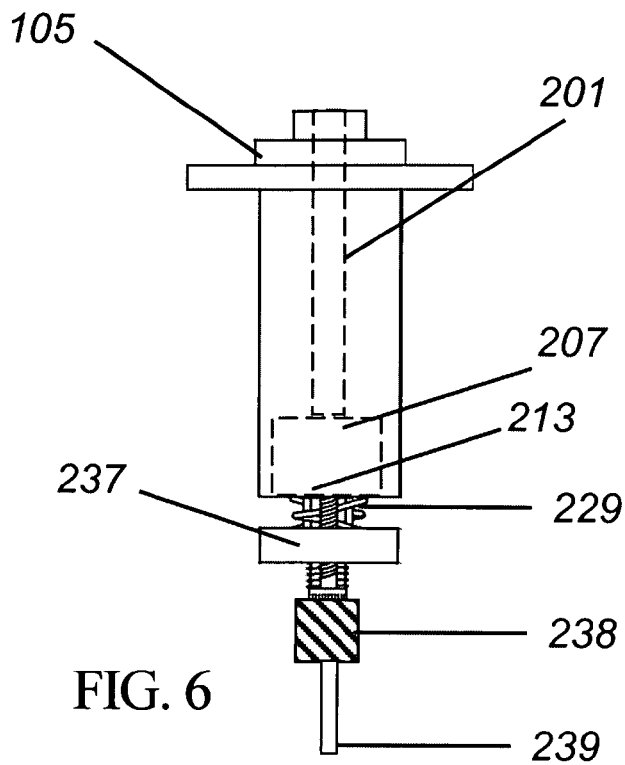
FIG. 6 is a plan view of the socket.
Figure 7:
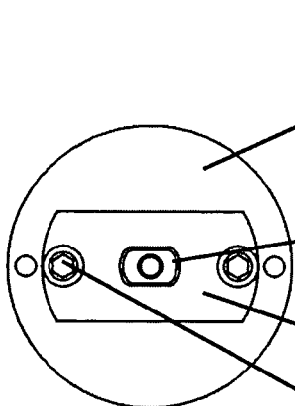
FIG. 7 is a rear view of the socket.
Figure 8:
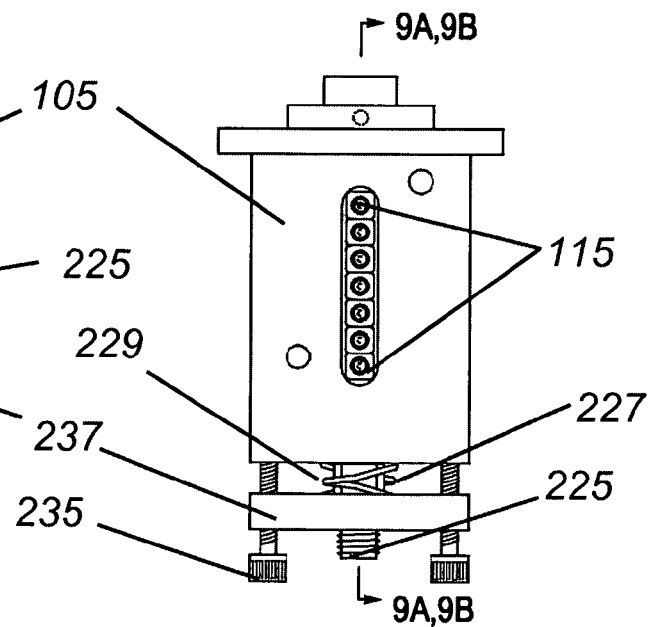
FIG. 8 is a plan view of the socket showing the contact pins.
Figure 9A:
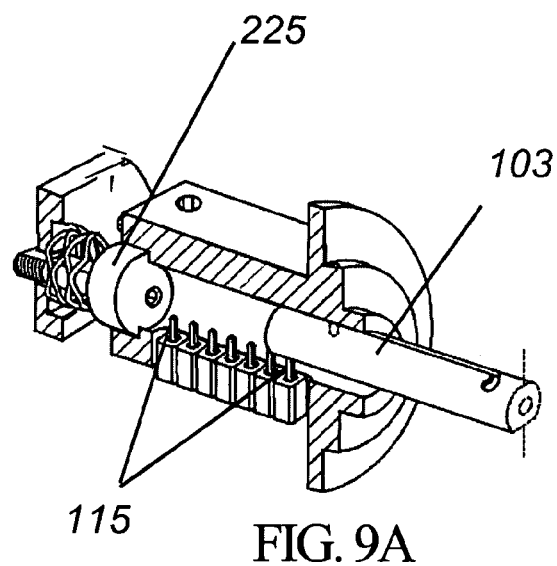
FIGS. 9A and 9B are sectional perspective views illustrating insertion and rotation of the plug.
Figure 9B:
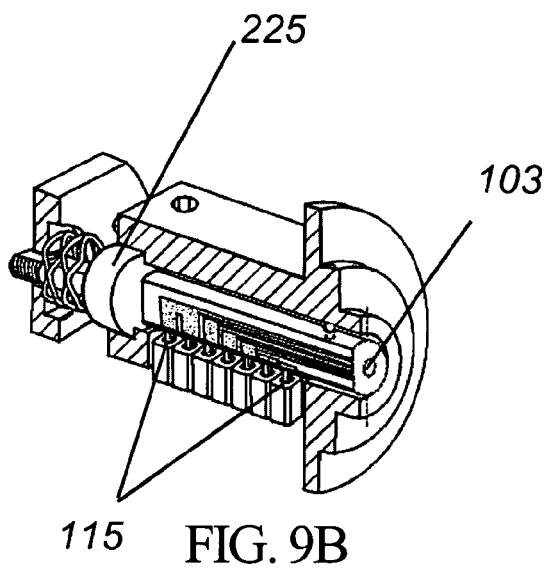

For the purposes of this invention, the following definitions are provided:

Hybrid Connector: A connector that contains both optical and electrical transmission lines to be coupled. Also called a Mixed Connector.

Plug: The elongated, shaft-like member of the connector. Also called a Male Plug or Shaft.

Socket: The hollow, receiving-chamber member of the connector, to which the Plug member is coupled by insertion of the plug into the receptacle. Also called a Female Socket, Receptacle, or Chamber.

Peripheral: Located on or near the outer surface of the plug shaft, or along the inner chamber surface of the socket receptacle. Examples of peripheral contacts include an array of electrical pad elements located circumferentially on the surface of a rod-shaped plug, or a linear card edge located near the surface of a rod-shaped plug (c.f. central).

Central: Located at the inner or central region, not peripherally. For the shaft of a plug, the core is toward the center of the shaft; for a socket, the core is located toward the axial central portion of the space in the socket chamber (c.f. peripheral).

Axial: Along the long axis of an elongated member or connector insertion path. Also called the Z-Axis (c.f., planar).

Planar: Located perpendicular to the long axis of an elongated member or connector insertion path. Also called the X-Y axis.

Z-Tolerant or Axially Position-Tolerant: An element for which proper operation or coupling is not highly dependent upon an exact position of the inserted plug relative to a receptacle socket in the axial (Z-axis) direction.

Axial Array: A set of at least two contact elements deployed axially, for example a linear row of electrical contact pads are each deployed circumferentially at different fixed distances along the length of the shaft of a plug (c.f., planar array, below).

Planar or X-Y Array: A set of at least two contact elements deployed in a plane perpendicular to the insertable plug face. An example of an X-Y array is a conventional computer D-pin array, in which the elements are arrayed in rows and columns along a flat plug and socket face.

Circumferential: Following the circumferential curve of a rod, shaft, or chamber, while keeping, more or less, the same linear distance from the end of the rod, shaft, or chamber. A circumferential element may be a circular ring (fully circumferential), or an open ring or short arc (semi-circumferential).

A semi-circumferential ring, pad, or arc shaped element only partially encircles the rod, shaft, or chamber.

Rotationally Engaged: A connector that is rotated in order to lock the probe and/or engage one or more sets of contacts.

Optical Coupling: The arrangement of two optical elements such that light exiting the first element interacts, at least in part, with the second optical element. This may be free-space (unaided) transmission through air or space, or may require use of intervening, fixed or floating optical elements such as lenses, filters, fused fiber expanders, collimators, concentrators, collectors, optical fibers, prisms, mirrors, or mirrored surfaces.

Electrical Coupling: The arrangement of two electrical elements such that the two elements can electrically interact and, in most cases, useable current can flow between them.

Floating Coupler: A Z-tolerant optical coupling element. In one example, the Z-tolerant optical coupling element is a spring-loaded floating coupler that physically moves axially to allow for a high-precision coupling of two or more optical fibers, while allowing for tolerance of significant variance in the axial position of one fiber to the other, thus enabling a quality optical coupling that is tolerant of axial positional error without the risk of poor optical coupling due to excessive fiber face to fiber face distance, or of damaging the coupled fiber faces due to insufficient fiber face to fiber face distance. In another example, the Z-tolerant optical element is a set of collimating lenses that have a relative insensitivity to the distance between the lens elements, allowing for Z-tolerance in the distance between the coupled fibers to be of low importance to the quality of the optical connection.

DESCRIPTION OF A PREFERRED EMBODIMENT

Referring to FIG. 1A, the connector includes male plug 103 having axial shaft 107, shown disengaged from female socket assembly 105. Shaft 107 contains an axial central optical fiber which terminates in a ferrule 108 (FIG. 3A). Shaft 107 may accommodate multiple optical fibers. Ferrule 108 is just one example of an optical coupling element, and other equivalent elements would work provided they result in optical coupling across the connector. In FIG. 1A, circuit board 110 is shown detached from socket 105. Circuit board 110 includes a plurality of spring 117 loaded contact elements 113, shown in enlarged view in FIG. 1B, which projects into socket 105 through slot 114 shown in dotted line. It is apparent that contact elements 113 and 117 may form a part of the socket in an alternative embodiment of the present invention.

FIG. 2 is a perspective view of male plug 103 rotated to show a plurality of electrical contacts 109 which extend from flat surface 116 onto rounded portion of the shaft for electrical contact with contact elements 109. The number of contacts depend upon the electrical requirements of the electro-optical device with which plug 103 is associated. Electrical contacts 109 may be plated copper pads on a flexible circuit board that is adhered to the shaft. Contacts 109 are mounted along flat portion 116 of the shaft and extend onto rounded portion 118 of the shaft. Contacts 109 have axially extending leads 109a and circumferentially extending leads 109b. Such use of flexible printed circuit contacts facilitates the rapid mass production after injection molding of the plug or shaft and further allows direct connection to integrated circuits which may be embedded in the connector such as EEPROM memory 111.

Referring to FIGS. 1A, 1B, 2, 3A, 3B and 5, shaft 107 has L-shaped alignment channel 112 diametrically opposite flat surface 116 (FIG. 2) of plug 103. Socket 105 includes pin 119, shown in FIG. 1A and FIG. 3A, which engages alignment channel 112 as shaft 107 is slideably inserted into socket 105, as illustrated in FIG. 3A. The axial movement of shaft 107 is stopped when pin 119 engages arm portion 120 (FIG. 5) of groove 112. Shaft 107 is then rotated so that pin 119 travels into the perpendicular extending portion of groove 112, until it is fully engaged. Initially, as shaft 107 is inserted, contact elements 109 on flat portion 116 of shaft 107 do not engage spring loaded contacts 113 (FIG. 1B). However, after shaft 107 is inserted and rotated, the portion of shaft contacts 109 extending onto rounded portion 118 of shaft 107 is brought into rotational engagement with the socket contact elements, described below, to provide electrical contact. Thus, the electrical connection portion of the connector has been described.

Figure 10:
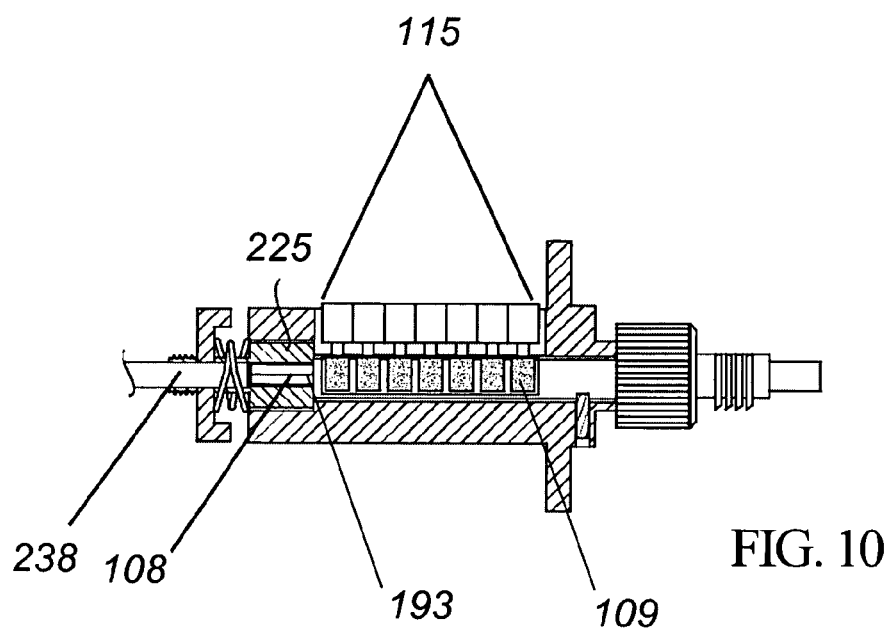
FIG. 10 is a sectional view showing the plug inserted into the socket.

Turning now to FIGS. 6-10, the optical coupling portion of the connector is now described. Socket 105 includes central bore 201 which is enlarged in region 207 at its distal end to terminate in shoulder 213. The enlarged bore receives floating spring-loaded optical coupling element 225 which has a portion of reduced diameter 227 to receive spring 229. End plate 237 is secured to the end of socket 105 by, for example screws 235, and engages the other end of spring 229 to urge coupling element 225 in the axial direction so that it abuts shoulder 213. Optical cable such as SMA-connected cable 238 with optical fiber 239 extends into coupling element 225 a predetermined distance. The end of cable 238 may be polished to present the optical fiber face at optical coupling element 225. When plug 103 is inserted into socket 105, coupling element 225 receives ferrule 108 (FIG. 5) at the end of plug 103 and centers and guides ferrule 108 until shoulder 193 at the end of the plug engages the end of coupling element 225, as shown in FIG. 10. At this point the end face of ferrule 108 and the face of optical cable 238 are accurately spaced and positioned with respect to one another for good optical coupling without physical contact. The plug can then be rotated for providing the sliding electrical contact described above.

Thus the coupling element is adapted to receive the ferrule when the plug is inserted into the socket and the distance between the end of the ferrule fibers and the end of the coupler fibers are closely spaced to one another to provide the optical coupling. As a result there is one-to-one alignment of the optical fibers as the electrical contact is made and the plug is inserted into the socket. Thus, the optical connection portion of the connector has been described.

Figure 11:
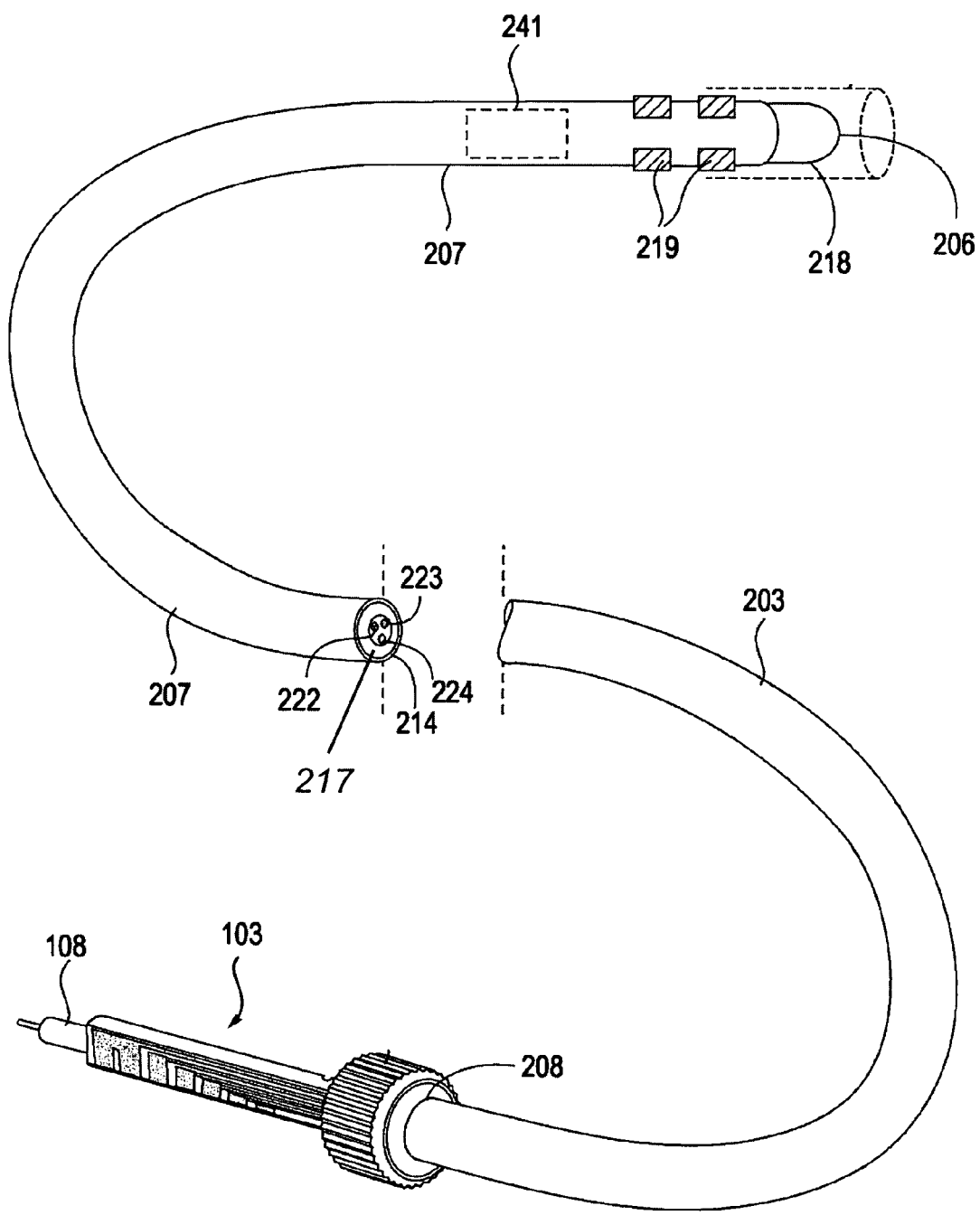
FIG. 11 shows a medical probe incorporating the Z-tolerant hybrid connector of FIGS. 1-10.

The connector as described can be incorporated into devices. For example, connector plug 103 can optionally be embedded within a medical device, as shown with plug 103 embedded in medical catheter probe 203 (FIG. 11). Probe 203 has patient-end 206, catheter body 207, and monitor-end 208. In probe 203, flexible body 207 consists of a section of US FDA class VI heat shrinkable tubing 214 surrounding medical grade Tygon™ tubing 217, both of which are further swaged to light illuminator 218 at swage points 219 near probe patient end 206. Wires 222 and 223, from electrical contacts 109 of plug 103 (as shown in FIGS. 3A, 3B) travel through concentric tube 214 and 217 and terminate by connecting to contacts 109 of plug 103 at monitor end 208. Optical connection fiber 224 from illuminator 218 travels from the patient tip of probe 203, running parallel with wires 223 and 224 inside concentric tubes 214 and 217, to terminate in ferrule 108 of monitor-end plug 103. Plug 103 is a reversible hybrid connector plug containing the electrical and optical connections described above.

Probe 203 may be made "smart" with optional memory chip 241 integrated into probe body 207. This chip may retain information useful in the operation of the device, such as calibration parameters, a reference database, a library of characteristic discriminant features from previously identified tissues, and so on, and this information may be accessible via plug 103. Additionally, information on chip 241 may include probe identification, probe serial number, use history, calibration details, or other information accessible through plug 103.

Figure 12:
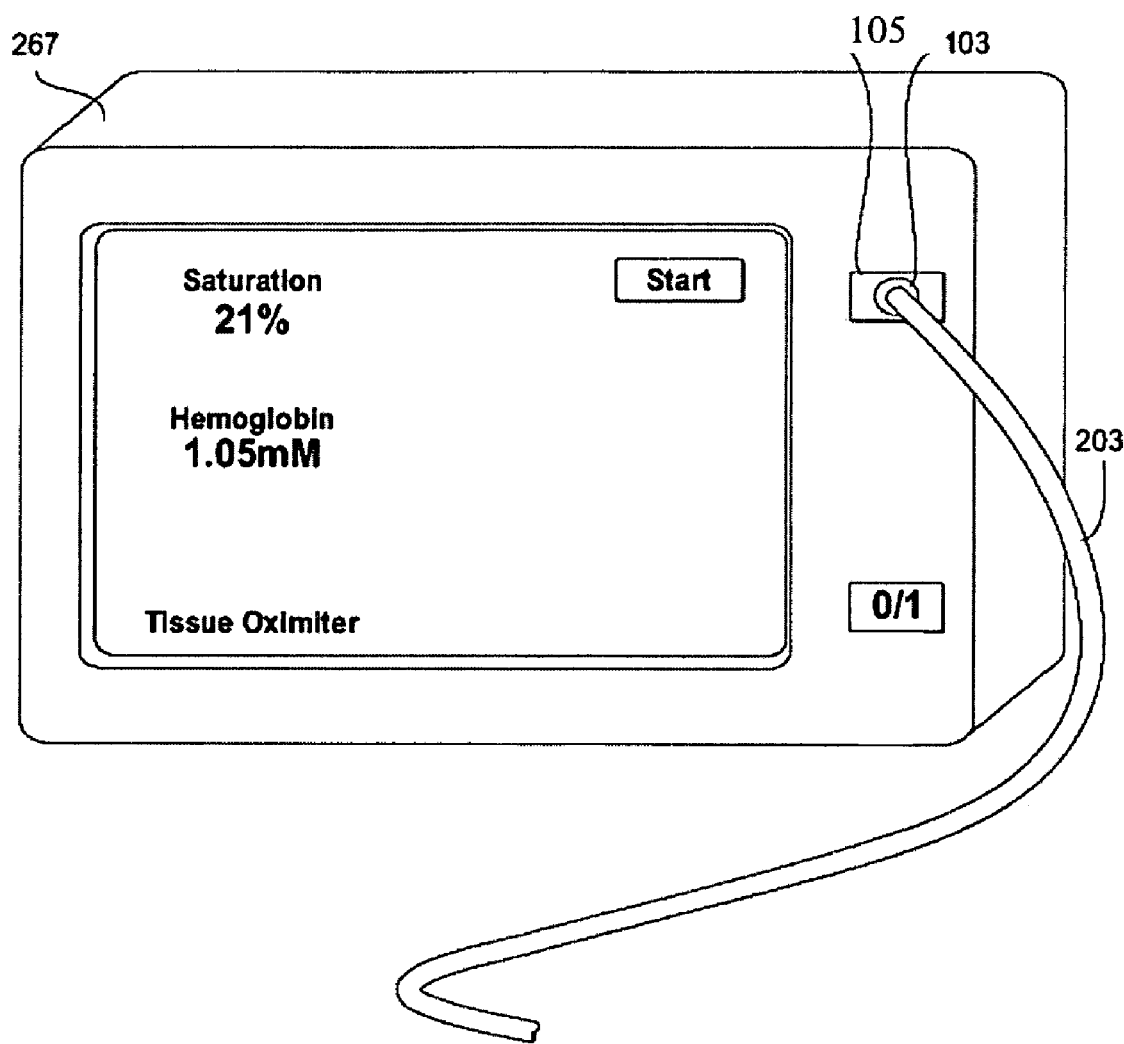
FIG. 12 shows a medical monitor incorporating the Z-tolerant hybrid connector of FIGS. 1-10 to which the probe of FIG. 11 is attached to form a complete medical system.

Hybrid connector 103 may also be incorporated into a device, such as medical system 267, as shown in FIG. 12 with probe 203 attached to system 267 via plug 103 and socket 105. Examples of such a spectroscopic device are disclosed in WO 03/086173.

Operation and use of the connector is now described. In this example, connector plug 103 is incorporated into medical catheter probe 203, and connected to spectroscopic monitoring device 267 via socket 105 as shown in FIG. 12.

Referring again to FIGS. 3A, 3B, Plug 103 is first inserted into socket 105. To accomplish this, plug 103 is held in axial alignment with socket 105. Probe shaft 107 is then inserted into socket 105 after aligning pin 119 of socket 105 mates with slot 112 of plug 103. This movement is illustrated by axial insertion/removal arrow 133. Connector plug 103, and ferrule 108 are pushed with zero to low insertion force until they are fully inserted.

Referring again to FIGS. 5-8, a key step now occurs. Ferrule 108 of plug 103 is automatically aligned, and it mates with floating optical coupler 225 a few millimeters before ferrule 108 is fully inserted. The faces of the optical fiber to be coupled would likely be either damaged due to contact collision, or the faces would be too far separated to be efficiently coupled. However, in this embodiment, coupler 225 is a floating connector, held as forward as allowed in the design toward the insertion (entry) end of socket 105 by spring 229. As ferrule 108 reaches full insertion in coupler 225, the fiber faces are allowed to continue to remain within microns of each other, without collision, and while ferrule 108 is fully inserted into, coupler 225. Coupler 225 moves to absorb the further and final forward movement of ferrule 108. This movement allows pin 119 of socket 105 to be fully inserted along slot 112 of plug 103, bringing ferrule 108 into effective optical contact with optical coupler 225. Electrical contacts 109 are also now in axial but not rotational alignment with socket electrical contact array 115. Thus, plug contact array 109 and socket array 115 remain out of electrical contact at this time.

Finally, plug 103 is rotated ¼ turn clockwise in socket 105, a movement not permitted during the initial axial insertion into socket 105 because channel 112 permits only axial in-out movement. However, once plug 103 is fully inserted into socket 105, rotation is then permitted because pin 119 can now turn into partially-circumferential short-arm 120 of channel 112, as shown in FIG. 3. Once pin 119 has rotated to the distal end of short-arm 120, plug 103 is fully rotated and cannot rotate further in the same direction. The rotation of plug 103 after axial insertion performs at least three functions. First, pin 119 is now in the distal portion of short-arm 120 of channel 112, securing and locking plug 103 in place and preventing axial displacement or removal of plug 103 from socket 105. Second, ferrule 108 is held with pressure in continued optical alignment in coupler 225, maintaining proper optical fiber alignment and spacing despite probe movement in, then slightly out, in the Z-axis axial direction. Third, contact array 109 is held in sustained electrical contact with socket array 115.

Some probes may also require an illumination fiber, such as illumination fiber 143 of FIG. 4, or other additional fiber channels, without critical alignment requirements. Such illumination fibers can use other optical ferrules added to the probe; in other cases, these additional fibers may not be as alignment critical.

In some cases, memory chip 111 of FIG. 2 can be added to the connector, or memory-read circuitry can be added to the socket as well, or vice-versa.

Last, additional non-contact connections can broaden utility. For example, a "passive" radio-frequency identifier chip can perform the handshaking function with an internal memory chip, allowing a circuit in the female side to query and read a chip on the male side. Similar effects can be accomplished with an active transmitter on the male side, using known wireless linking technologies known in the art. In fact, the power for the illuminator could even be transmitted, as non-contact power transmission technologies are now also known.

EXAMPLES

Operation of the device is demonstrated in the following examples, constructed using a shaft and socket connection constructed in accordance with the present invention.

Example 1

Figure 13A:
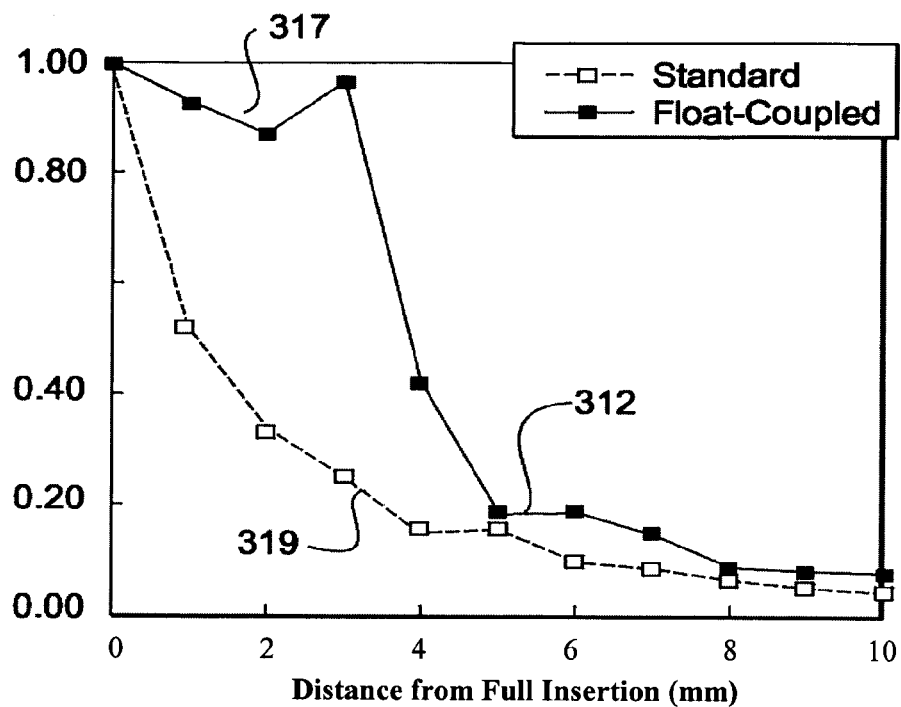
FIG. 13A is a graph showing a plateau of Z-tolerant connections, the ability of using a floating optical connection designed in accordance with the present invention.

A working version of the optical and electrical hybrid connector was constructed in accordance with the disclosed invention. Light throughput was recorded in using an EXFO optical power meter (Exfo, Quebec, Canada) through 100 micron glass/glass optical fiber (FV100/101/125 silica clad fiber, Polymicro Technologies, Phoenix Ariz.) as the shaft plug is inserted in the receptacle socket. Axial displacement relative to the final, fully inserted position was recorded at intervals of 1 mm over the final 1 cm of insertion. Referring now to FIG. 13A, the recorded optical power values were plotted as line 312, which is a function of relative optical throughput vs. distance from the fully inserted connector position. There is noted plateau region 317 spanning the final 2 mm of insertion, in which the intensity of transmitted light does not fall by more than 12%, demonstrating (by definition) an axial-position tolerance, as intended in the present invention.

The above experiment was then repeated using the same shaft and socket system, but in this case with optical coupler 225 (FIG. 8) and spring element 229 (FIG. 8) secured such that the floating action was completely ablated. Referring again to FIG. 13A, the recorded optical power values were plotted as line 319. There is no stable plateau region in transmitted intensity line 319 with shaft axial position—even a 1 mm displacement results in 50% signal loss—showing that without the floating element, Z-tolerance is lost.

The relevance of the above experiment is that the manufacturing of a metal or plastic shaft with millimeter tolerance (i.e., ±1 mm), the axial tolerance is well handled by the Z-tolerant floating connector design. In contrast, the non-floating system does not exhibit Z-tolerance, and therefore requires micron manufacturing tolerances (e.g., 0.02 mm, or ±20 microns). The high precision required in the non-Z-tolerant connector necessitates significantly more precise and costly stainless steel molds and/or laser drilled components. In our experience, a Z-tolerant shaft plug can be produced for about one-fifth the cost of the non-tolerant shaft in similar volumes.

Example 2

An optical and electrical hybrid connector was constructed wherein optical coupler 225 was an SMA optical coupler/connector with integrated reversed beam expander optics (Model F230SMA-A collimator, Thorlabs, Newton, N.J.), and further, spring 229 was omitted such that the physical floating action of coupler 225 was completely eliminated. The design, however, remains Z-tolerant, as the collimating lens now provides a lens-coupled axial-position-tolerance.

Figure 13B:
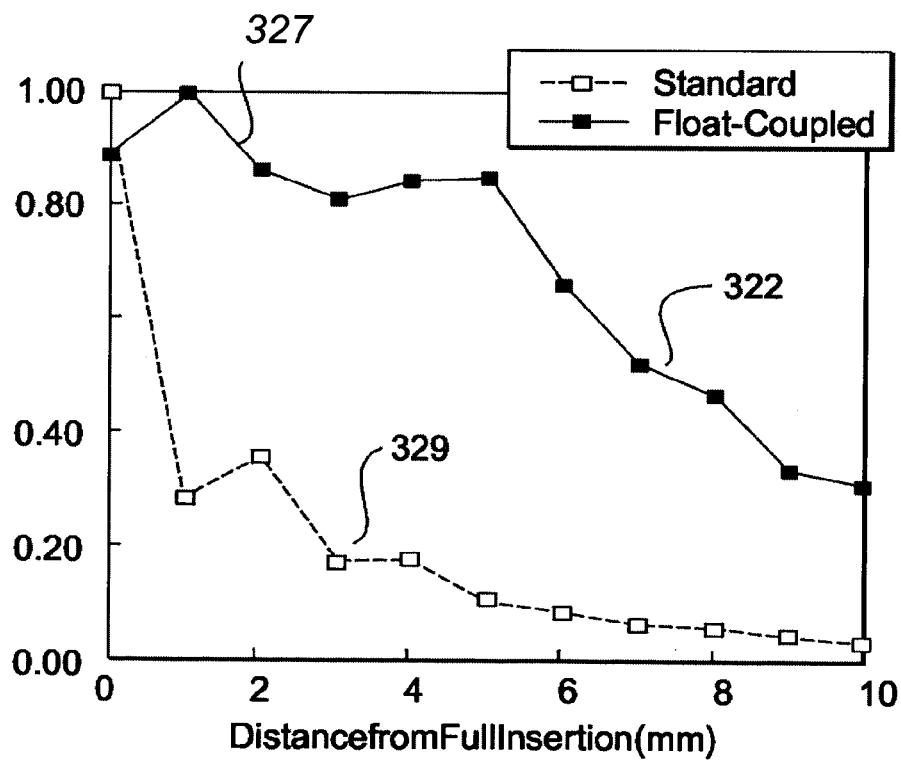
FIG. 13B is a graph showing a plateau of Z-tolerant connections, the ability of using a coupling lens element designed in accordance with the present invention.

As before, light throughput was recorded using an optical power meter through 100 micron glass/glass optical fiber as the probe was inserted into the connector. Axial displacement from the final, fully inserted position was recorded at intervals of 1 mm over the final 1 cm of insertion. Referring now to FIG. 13B, the recorded optical power values were plotted as line 322, which is a function of relative optical throughput vs. distance from the fully inserted connector position. There is noted plateau region 327 spanning the final 5 mm of insertion, in which the intensity of transmitted light does not fall by more than 20%, demonstrating (by definition) an axial-position tolerance. In this case, the Z-tolerance comes not from a floating element as in Example 1, but rather from the lens-coupled collimator that increases the Z-tolerance of the optical coupling.

The above experiment was then repeated using the same shaft and socket system, but in this case with the non-floating optical coupler from Example 1, above, in place of lens-coupled optical coupler of the above paragraph. This is identical to the setup of the non-Z-tolerant experimental set up of Example 1. Referring again to FIG. 13B there is no plateau region in transmitted intensity line 329 with changes in shaft axial position, showing that without the lens-coupled element, Z-tolerance once again no longer exists.

Other methods of hybrid connection Z-tolerance may be envisioned, including the combination of lens- and float-coupled optical elements, or alternative methods readily apparent to one skilled in the art. The examples of lens- and float-coupled elements are provided merely as examples, and are not intended to be limiting with respect to the present invention.

In summary, an improved hybrid connector can result from an axial position-tolerant hybrid connector with a central fiber set, a peripheral axial electrical connector array, and a Z-tolerant optical and electrical connection. In certain applications, such as medical applications, this allows for single-connector, quick-connect, quick-disconnect, self-aligning, low-insertion-force probes with an on-board memory chip identifying the probe. Such improved connectors permit hybrid connections to be easily added into a medical probe, catheter, or monitor system.

We have discovered an improved Z-tolerant hybrid optical and electrical connector for making reversible, for single-connector, quick-connect, quick-disconnect, self-aligning, hybrid connections. Such a connector has been constructed and tested, and incorporated into a medical catheter, all constructed in accordance with the present invention. An EEPROM memory chip within the shaft allows for tracking, identification, and calibration of the probe. Medical probes and systems incorporating the improved illuminator, and medical methods of use, are described. This device has been built and tested in several configurations, and has immediate application to several important problems, both medical and industrial, and thus constitutes an important advance in the art.

What is claimed is:

1. An optical and electrical hybrid connector comprising:
   (a) a male plug having an axially elongated plug shaft, said shaft having a first central set of one or more optical fibers terminating in an optical ferrule and a second peripheral set of one or more electrical contact elements arranged in an axial array and axially-shaped along said plug shaft;
   (b) a socket for receiving said plug shaft, said socket having a central axial-potion-tolerant optical coupling element having one or more optical fibers and a peripheral set of one or more electrical contacts;
   (c) said individual fibers and contacts of said plug arranged so as to make respective optical coupling with corresponding said individual fibers and electrical contacts of said socket when said plug shaft is slidably, and axially received into said socket.

2. The connector of claim 1, wherein said optical coupling element comprises a floating connector arranged in said socket so as to move axially in said socket with pressure, and further arranged to maintain a minimum physical gap between the one or more fibers in said plug ferrule and one or more fibers in said socket optical coupling element over a range of predetermined distances of axial insertion of said shaft into said socket.

3. The connector of claim 1, wherein each axial-position-tolerant optical coupling element comprises a collimating lens element coupled to said one or more fibers in said coupling element, said collimating lens arranged to provide optical coupling of said shaft optical fibers to said coupling element fibers over a range of predetermined distances of axial insertion of said shaft into said socket.

4. The connector of claim 1, wherein said peripheral set of electrical contacts comprises a flexible printed circuit board adhere 1 to the outer surface of the shaft of said male plug.

5. The connector of claim 1, wherein further said socket has an alignment pin, said shaft has an L-shaped channel for receiving said alignment pin and preventing rotation of said shaft during axial insertion into said socket, said shaft having a flat region with said peripheral electrical contact elements further arranged so as not to make electrical contact with said socket contacts during said axial insertion and further arranged so as to make electrical contact with said socket electrical contacts after the shaft is fully inserted and rotated when the pin is at the end of the elongated channel.

6. The connector of claim 1, wherein said shaft is cylindrical with a flat portion, said electrical contacts have axial portions and axially spaced circumferential portion which extend from the flat portion on the cylindrical portion so as not to make electrical contact with said socket contacts during insertion of said shaft in said socket, and bring said socket contacts into reversible electrical contact with said contact during partial rotation of said shaft after said slidable insertion into said socket.

7. The connector of claim 1, further comprising an L-shaped alignment channel on said shaft and a pin on said socket adapted to ride on said alignment channel for ensuring rotational orientation during said slideable insertion and subsequent rotational locking of the shaft.

8. The connector of claim 1, further comprising a memory element, said memory element carried by said male plug and electrically coupled to said selected electrical contacts.

9. The connector of claim 1, further comprising additional alignment insensitive optical fibers.

10. The connector of claim 1 further comprising:
   (a) a biocompatible catheter sheath, said catheter sheath having a monitor end, a central body, and a patient end;
   (b) the optical and electrical hybrid male plug located at the monitor end of said catheter;
   (c) a light source at the patient end of said catheter;
   (d) at least one optical collection fiber for collecting light scattered from a region illuminated by the light source and for transmitting said collected light from said patient end of the catheter, along a length of said catheter and into said male plug at the monitor end of the catheter; and (e) power supply wires for transmitting electrical power to said light source, said wires traversing a length of said catheter and electrically connected to both said light source and to contacts on said connection plug.

11. The connector of claim 10, further comprising embedded identification and or data memory elements, said memory elements accessible across said selected electrical contacts or by non-contact devices such as RFID chips, said memory elements arranged to be located in one or more of said monitor end, said central body, or said patient end of said catheter.

12. The connector of claim 10, further comprising non-contact power transmission technologies.

13. The connector of claim 1, further comprising one or more embedded identification and or data memory elements.

14. The connector of claim 13, wherein said at least one memory element is arranged to be located on the male or female side of said connector.

15. The connector of claim 13, wherein said memory element comprises:
EEPROM memory, RFID, or other memory elements.

16. The connector of claim 13, wherein said memory element is accessible via wireless linking technology.

17. The connector of claim 13, wherein said memory element is accessible across said selected electrical contacts or by non-contact devices such as RFID chips.

18. The connector of claim 13, wherein information stored on said memory element includes at least information comprised of: probe identification, probe serial number, measure of use history, calibration of the probe, tracking of the probe, calibration parameters, reference database, library of characteristic discriminant features, or other accessible information.

19. A hybrid electrical and optical coupler, comprising:
a first member having an axially elongated shaft, said shaft having a central core of one or more optical fibers and a peripheral array of one or more electrical contact elements arranged in an axial array and axially spaced along said shaft, each of said fiber terminating in an optical ferrule, and
a socket for slidably and insertably receiving said elongated shaft, said socket having a central axial-position-tolerant optical coupling member and one or more electrical contacts wherein after insertion of the shaft into the socket said shaft optical fibers and electrical contacts make contact with said axial-positioned-tolerant optical coupling member and said socket contacts.

20. The coupler of claim 19 further comprising:
(a) a biocompatible catheter sheath, said catheter sheath having a monitor end, a central body, and a patient end;
(b) the optical and electrical hybrid male plug located at the monitor end of said catheter;
(c) a light source at the patient end of said catheter;
(d) at least one optical collection fiber for collecting light scattered from a region illuminated by the light source and for transmitting said collected light from said patient end of the catheter, along a length of said catheter and into said male plug at the monitor end of the catheter; and
(e) power supply wires for transmitting electrical power to said light source, said wires traversing a length of said catheter and electrically connected to both said light source and to contacts on said connection plug.

* * * * *